United States Patent [19]

Hirakami et al.

[11] Patent Number: 4,563,035
[45] Date of Patent: Jan. 7, 1986

[54] AUTOMOBILE REAR BODY STRUCTURE

[75] Inventors: Kiyomi Hirakami; Kosuke Murakami, both of Hiroshima, Japan

[73] Assignee: Mazda Motor Corporation, Hiroshima, Japan

[21] Appl. No.: 596,616

[22] Filed: Apr. 4, 1984

[30] Foreign Application Priority Data

Apr. 7, 1983 [JP] Japan .................................. 58-62617

[51] Int. Cl.[4] ............................................. B62D 25/08
[52] U.S. Cl. .................................. 296/195; 296/204; 296/188
[58] Field of Search ............... 296/195, 198, 204, 203, 296/193, 188, 189

[56] References Cited

U.S. PATENT DOCUMENTS

| | | | |
|---|---|---|---|
| 3,517,765 | 6/1970 | Wessells | 296/195 |
| 3,627,373 | 12/1971 | Fox et al. | 296/195 |
| 4,440,438 | 4/1984 | Miyoshi et al. | 296/198 |
| 4,471,992 | 9/1984 | Matsuura et al. | 296/195 |

FOREIGN PATENT DOCUMENTS 56-4979  1/1981  Japan .

*Primary Examiner*—Robert R. Song
*Attorney, Agent, or Firm*—Burns, Doane, Swecker and Mathis

[57] ABSTRACT

An automobile rear body structure wherein the longitudinal frame for each side of the body structure is constituted by a first frame member welded to the undersurface of a rear floor panel and a second frame member positioned inside the rear luggage compartment having its bottom defined by a rear end portion of the rear floor panel which has been stepped down from the remainder of the rear floor panel. The first and second frame members are welded together through the peripheral lip region of the opening which has been defined in the rear floor panel for receiving the longitudinal frame therethrough.

4 Claims, 13 Drawing Figures

AUTOMOBILE REAR BODY STRUCTURE

BACKGROUND OF THE INVENTION

The present invention generally relates to an automobile body structure and, more particularly, to an automobile rear body structure, i.e., the structure at the rear of the automobile body structure.

In an automobile body structure wherein the bottom of the rear luggage compartment is delimited by the rear end portion of a rear floor panel which has been stepped down from the remainder of the rear floor panel, longitudinal frames extending in laterally spaced relation to each other in a direction lengthwise of the automobile body structure are arranged beneath the opposite side portions of the rear floor panel and, therefore, the space available for the rear luggage compartment is limited between these longitudinal frames and the space between each of the longitudinal frames and the adjacent rear side panel can not be utilized. In view of this, attempts have been made to utilize the longitudinal frames which are bent so as to follow the contour of the rear floor panel having the downwardly stepped rear end portion, but these attempts were not successful because no sufficient clearance between the ground surface to the longitudinal frames is available.

In order to maximize the available space for the rear luggage compartment without reducing the ground-to-frame clearance, the Japanese Laid-open Utility Model Publication No. 56-4979, published in 1981, discloses such a structure as shown in FIGS. 1 to 3 of the accompanying drawings, reference to which will now be made for the purpose of the discussion of the prior art to which the present invention pertains. However, it is to be noted that, in FIGS. 1 to 3, the automobile rear body structure is shown partially, i.e., only one of the halves of the rear body structure adjacent one of the opposite sides of the automobile body structure as a whole is shown, for the sake of simplicity.

Referring now to FIGS. 1 to 3, for each side of the automobile rear body structure, the longitudinal frame e employed in the prior art structure comprises a frame member c having one end mounted on a highland area of the rear floor panel a and extending rearwardly therefrom towards the rear luggage compartment b, and a frame member d having one end positioned on one side of the highland area of the rear floor panel a opposite to the frame member c and extending frontwardly therefrom, said one end of the frame member c and said one end of the frame member d being connected together in overlapping relation with a kick-up portion of the rear floor panel a intervening therebetween. In this prior art structure, since the longitudinal frame 3 is divided into the two frame members which are positioned so as to confront the interior and exterior of the body structure, respectively, and are connected together through the kick-up portion of the rear floor panel, the longitudinal frame e as a whole does not represent a linear configuration and, accordingly, the prior art rear body structure lacks a sufficient rigidity. By way of example, in the event of a rear-end collision, an impact resulting from the collision acts on the connection between the frame members forming the longitudinal frame 3 so as to axially displace the frame members in a direction close to each other and, in the worst it may happen, the frame members connected together to provide the longitudinal frame 3 would be separated. In addition, the connection between the frame members is complicated and, therefore, the internal reinforcement of the rear body structure to increase the physical strength and the rigidity is not easy with no difficulty.

SUMMARY OF THE INVENTION

Accordingly, the present invention has been developed with a view to substantially eliminating the above described disadvantages and inconveniences inherent in the prior art rear body structure and has for its essential object to provide an improved rear body structure which has both an increased physical strength and an increased rigidity with respect to the longitudinal direction thereof, and which is easy to fabricate.

To this end, the present invention provides an automobile rear body structure wherein the longitudinal frame for each side of the body structure is constituted by a first frame member welded, or otherwise connected, to the undersurface of the rear floor panel and a second frame member positioned inside the rear luggage compartment having its bottom defined by a rear end portion of the rear floor panel which has been stepped down from the remainder of the rear floor panel, said first and second frame members being welded, or otherwise connected, together through the peripheral lip region of the opening which has been defined in the rear floor panel for receiving the longitudinal frame therethrough. With this arrangement, it is possible to permit the longitudinal frame for each side of the body structure to extend substantially linearly in a direction parallel to the longitudinal axis of the automobile body structure as a whole.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Figure 1:
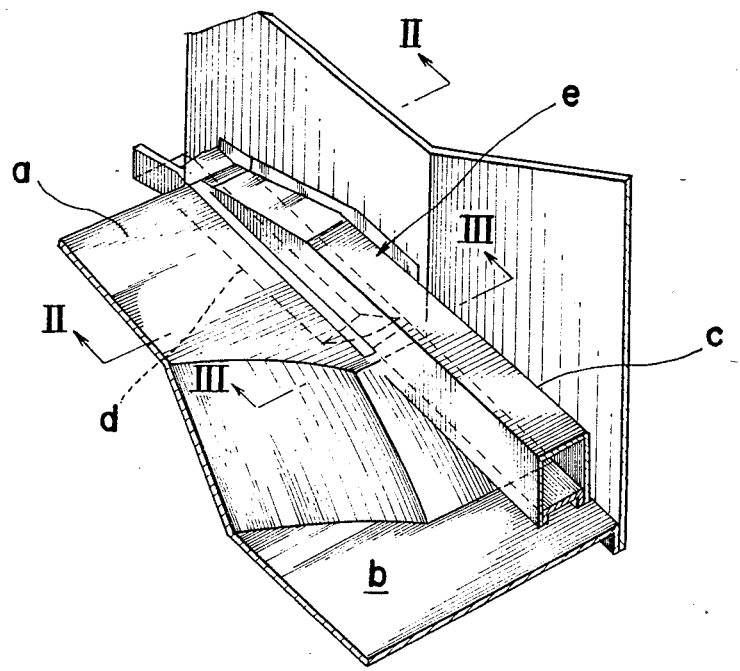
FIG. 1 is a fragmentary perspective view of the prior art rear body structure.
Figure 2:
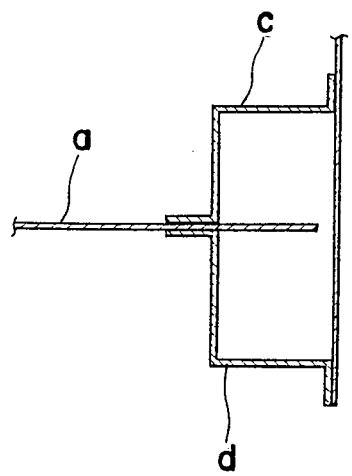
FIGS. 2 and 3 are cross-sectional views taken along the lines II—II and IV—IV in FIG. 1, respectively.
Figure 3:
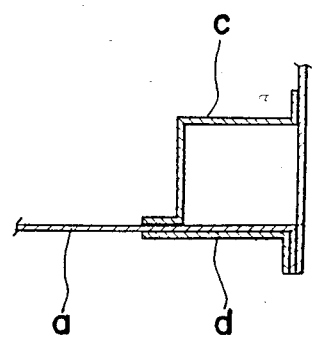
Figure 4:
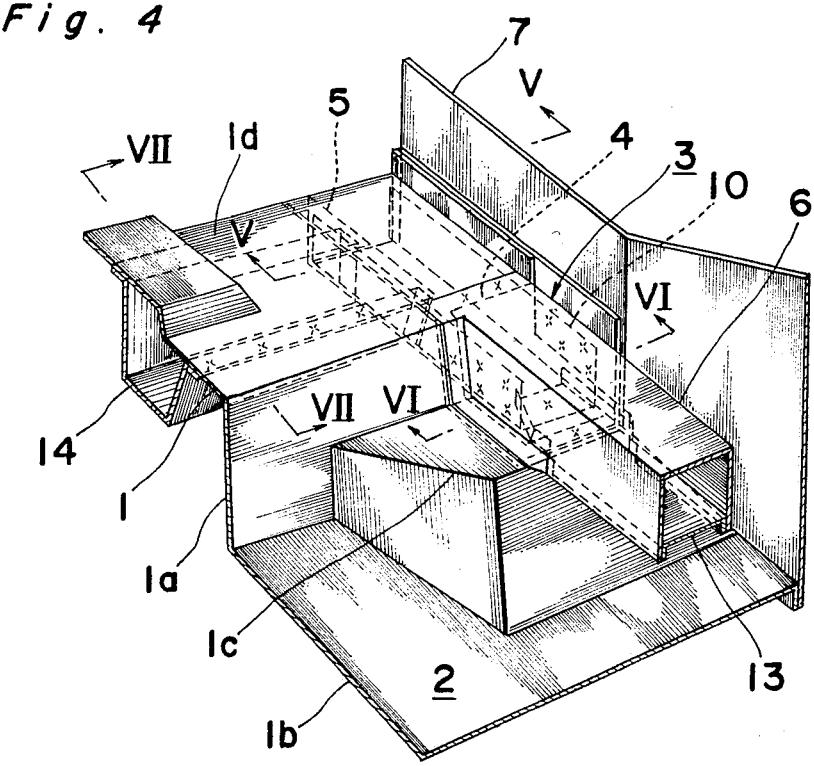
FIG. 4 is a view similar to FIG. 1, showing a rear body structure according to the present invention.

Before the description of the present invention proceeds, it is to be noted that, for the sake of simplicity and for better understanding of the present invention, only one of the halves of the rear body structure divided in the longitudinal direction will be described in detail.

Referring to FIGS. 4 to 8, a rear floor panel generally identified by 1 includes a highland area 1d and a lowland area 1b stepped down from the highland area 1d and continued thereto through an inclined area 1a, the lowland area 1b defining the bottom of a compartment which may be, for example, a rear luggage compartment 2. A corner portion between the inclined area 1a and the lowland area 1b and adjacent the corresponding side of the rear body structure is inwardly heaved at 1c so as to protrude into the rear luggage compartment 2.

The rear floor panel 1 has an opening 4 defined partly in the inclined area 1a and partly in the upheaved portion 1c for the passage of a respective longitudinal frame 3 therethrough in a manner which will be described subsequently. It is to be noted that one opening 4 is employed for each of the left-hand and right-hand longitudinal frames 3, only the right-hand longitudinal frame 3 being shown and referred to in the following description.

The longitudinal frame 3 is comprised of a generally U-sectioned first frame member 5 having a pair of side walls 5a and 5b and a bottom wall 5c and welded to the undersurface of the rear floor panel 1, and a second frame member 6 having a cross-sectional shape generally similar to the inverted shape of a figure "U" and also having a pair of side walls 6a and 6b and a top wall 6c, said second frame member 6 being arranged within the luggage compartment 2.

Figure 5:
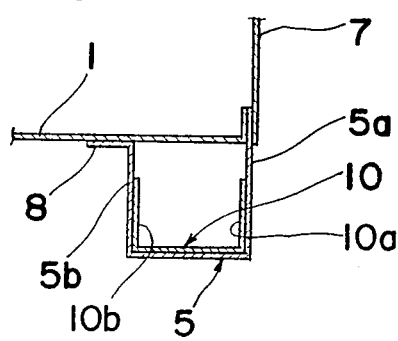
FIGS. 5 to 7 are cross-sectional views taken along the lines V—V, VI—VI and VII—VII in FIG. 4, respectively.

The side wall 5b of the first frame member 5 has its end portion removed to expose the bottom wall 5c and also has continued flanges 8 and 9 which are integral with the upper edge thereof and the end edge thereof, respectively. The first frame member 5 is held in position with the side wall 5a welded to a wheel house inner 7 as best shown in FIG. 5, while the flange 8 is welded to the undersurface of the rear floor panel 1, the flange 9 to the surface of the inclined area 1a which confronts in a direction opposite to the compartment 2, and the bottom wall 5c to the undersurface of the upheaved portion 1c. It is to be noted that, prior to the first frame member 5 being secured in the manner described hereinabove, one of the opposite end portions of a generally elongated reinforcement member 10 of generally U-shaped cross-section is received in and connected rigidly to the first frame member 5.

Figure 6:
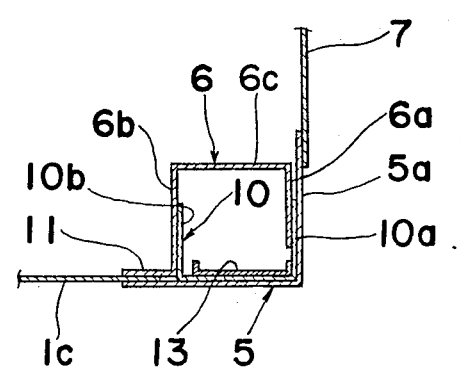
Figure 7:
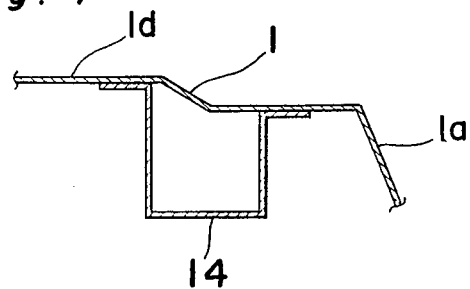
Figure 8:
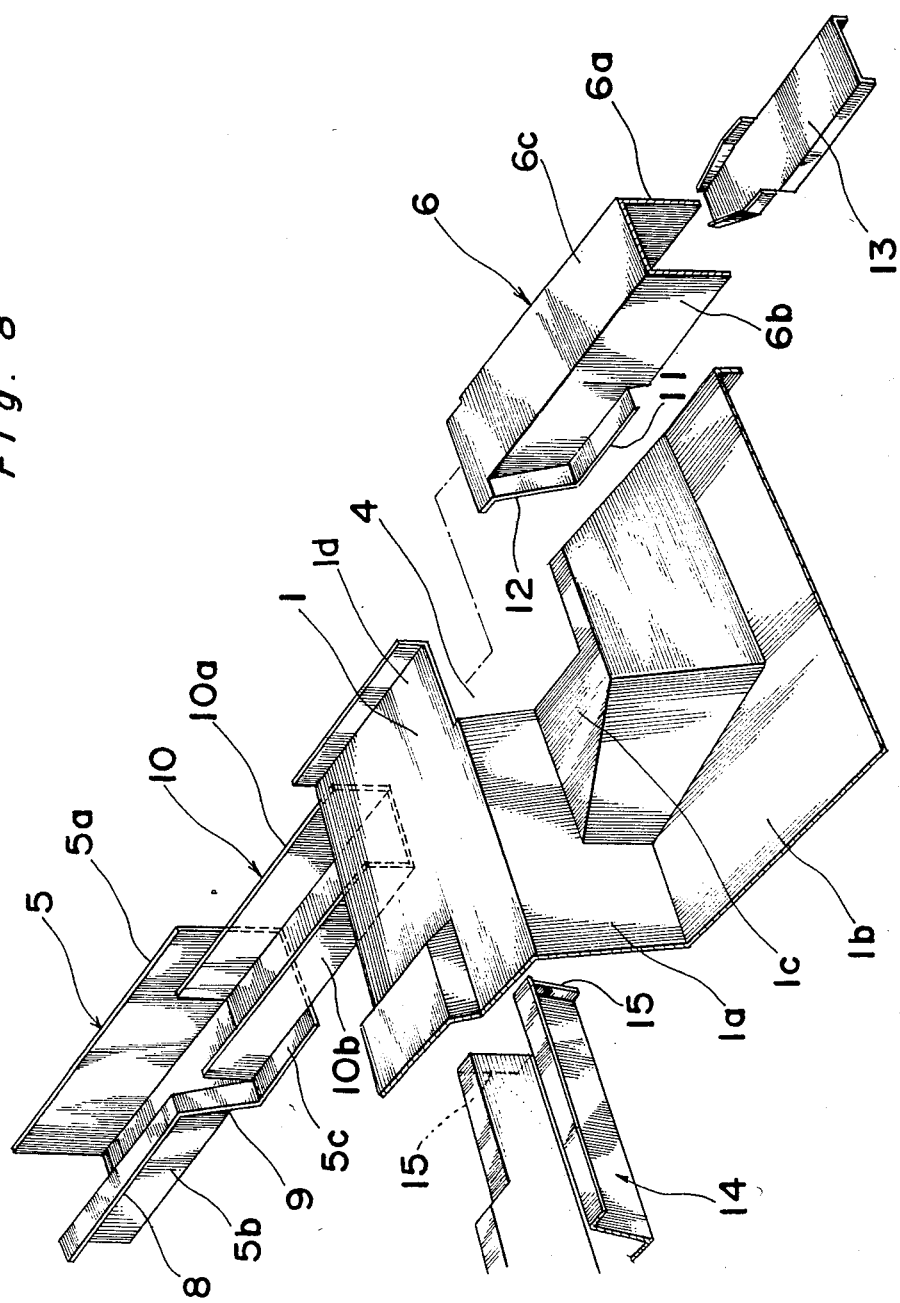
FIG. 8 is an exploded view of the rear body structure shown in FIG. 4.
Figure 9:
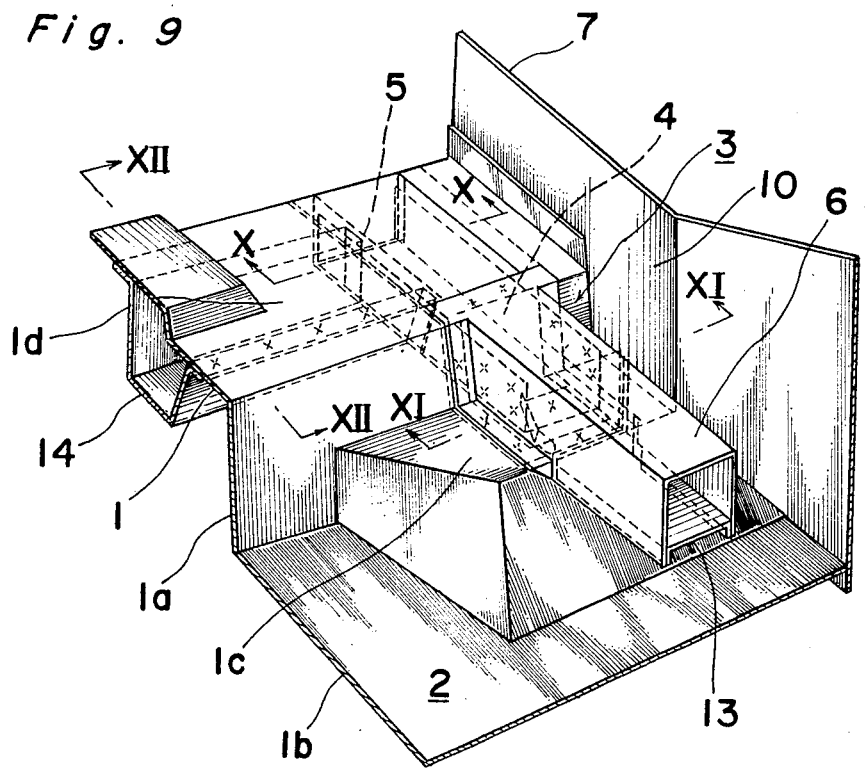
FIG. 9 is a view similar to FIG. 4, showing the rear body structure according to another preferred embodiment of the present invention.
Figure 10:
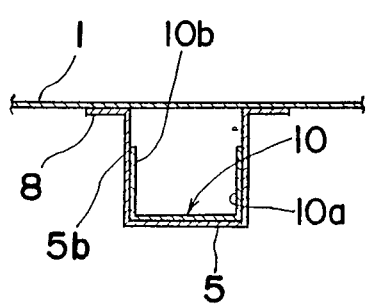
FIGS. 10 to 13 are cross-sectional views taken along the lines X—X, XI—XI and XII—XII in FIG. 9.
Figure 11:
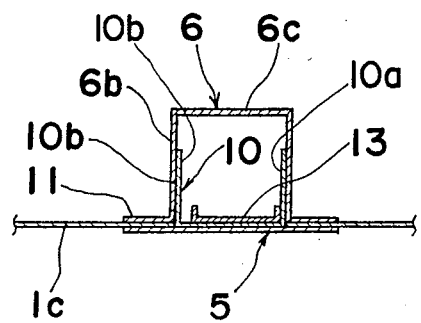
Figure 12:
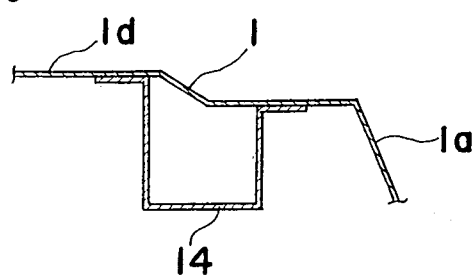
Figure 13:
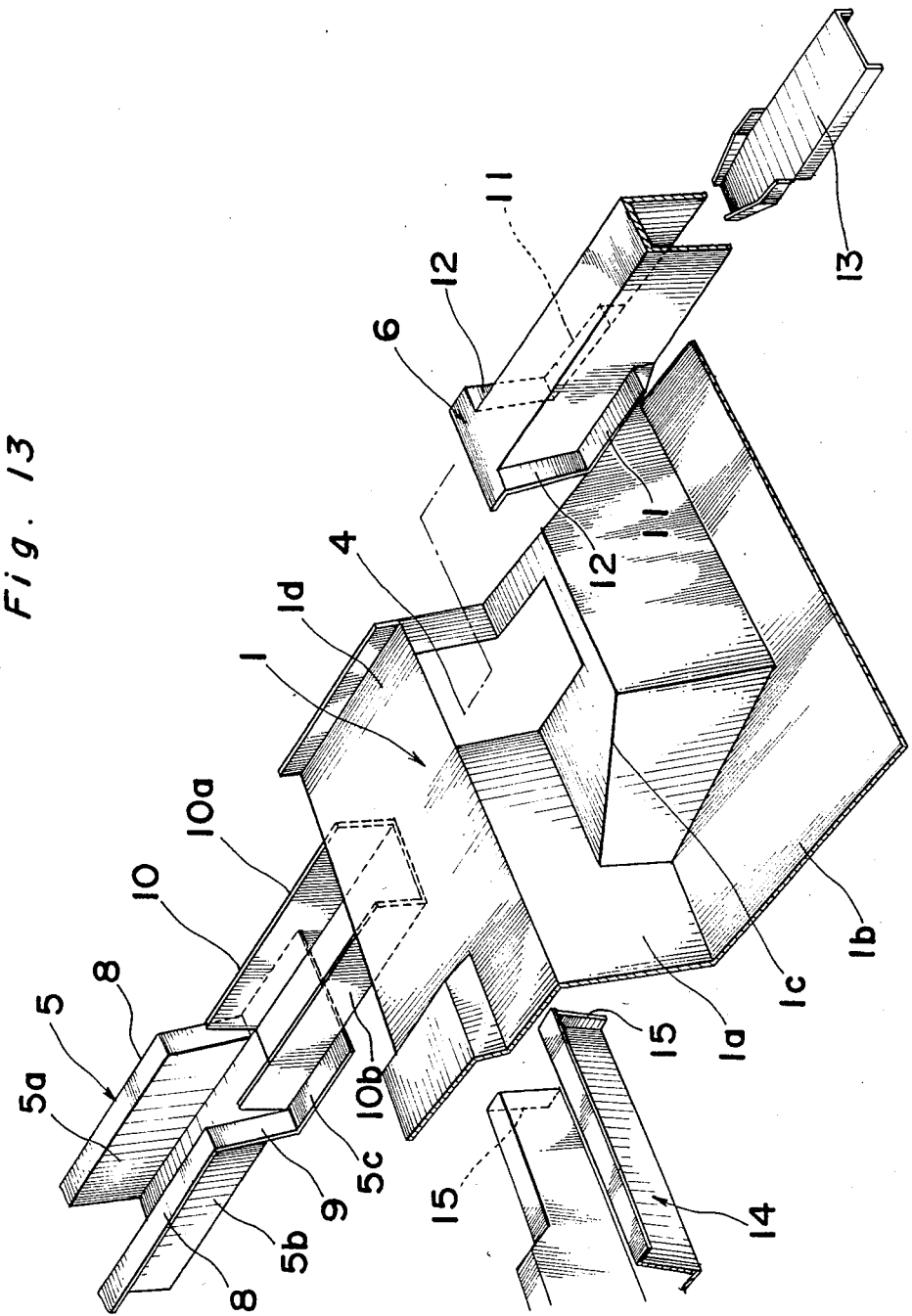

The side wall 6b of the second frame member 6 is formed integrally with continued flanges 11 and 12 protruding laterally thereof and so designed as to be welded to the upper surface of the upheaved portion 1c and the surface of the inclined area 1a confronting the compartment 2, respectively. The second frame member 6 is held in position with the side wall 6a welded to the side wall 5a of the first frame member 5 through a side wall 10a of the reinforcement member 10 as best shown in FIG. 6 while the side walls 6a and 6b are welded to the side walls 10a and 10b of the reinforcement member 10, respectively, and the flanges 11 and 12 are welded to the upper surface of the upheaved portion 1c and the inclined area 1a, respectively. The opening of the second frame member 6 between the side walls 6a and 6b and confronting the top wall 6c is closed by a generally elongated plate member 13. In this way, the first and second frame members 5 and 6 together constitute the longitudinal frame 3 of generally closed cross-section which is rigidly connected to the rear floor panel at the peripheral lip region of the opening 4 and extends generally linearly in a direction lengthwisely of the body structure.

A generally elongated cross member 14 secured to the undersurface of the rear panel 1 is also welded, or otherwise rigidly connected, to the side wall 5b of the first frame member 5 through flanges 15 integral therewith.

Thus, the automobile rear body structure can be obtained wherein the left-hand and right-hand longitudinal frames are rigidly connected with the rear floor panel. Since each of the left-hand and right-hand longitudinal frames has a generally closed cross-section and extends generally linearly in a direction parallel to the longitudinal sense of the automobile body structure as a whole, both the physical strength and the rigidity of the rear body structure can be increased to such an extent as to permit it to absorb impacts which may be applied in the event of the rear-end collision and also to protect both the passenger's compartment and the fuel tank.

In addition, since each of the longitudinal frames is made up by the two components, i.e., the first and second frame members, flanges of the second frame members within the rear luggage compartment can be so positioned as to orient downwards and, therefore, any damage which would be caused by the presence of edges can advantageously be avoided.

In the foregoing embodiment, the longitudinal frame 3 for each side of the body structure has been described as connected to the wheel house inner, but it may be spaced inwardly therefrom as shown in FIGS. 9 to 13. In the embodiment shown in FIGS. 9 to 13, flanges similar to the flanges 8 and 9 in the side wall 5b of the first frame member 5 are provided also on the opposite side wall 5a of the same frame member 5 for the connection thereof to the undersurface of the rear floor panel 1 on the one hand and flanges similar to the flanges 11 and 12 in the side wall 6b of the second frame member 6 are provided also on the opposite side wall 6a of the same frame member 6 for the connection thereof to the upheaved portion 1c.

The automobile rear body structure according to the embodiment shown in FIGS. 9 to 13 can produce substantially the same advantages and effects as delivered by that according to the embodiment shown in and described with reference to FIGS. 4 to 9.

Although the present invention has fully been described in connection with the preferred embodiment with reference to the accompanying drawings, it is to be noted that various changes and modifications are apparent to those skilled in the art without departing from the scope of the present invention as defined by the appended claims. By way of example, although each of the longitudinal frames has been described as rigidly connected directly to the associated wheel house inner, it may be arranged separately from the associated wheel house inner if desired.

Moreover, the shape of each of the longitudinal frames may not be limited to that shown and described, but may be arbitrarily chosen if it permits the longitudinal frame to extend generally linearly.

Accordingly, such changes and modifications are to be construed as included within the scope of the present invention.

We claim:

1. An automobile rear body structure of a type comprising a rear floor panel having a rear end portion thereof stepped down from the remainder thereof to define a stepped-down area which forms a bottom part of a rear luggage compartment, and also having a pair of spaced openings one for each side of the body structure, said spaced openings being defined in the stepped-down area of the rear floor panel, and also comprising a pair of spaced longitudinal frames extending generally linearly through the associated openings in the rear floor panel in a direction lengthwise of the body structure, each of said longitudinal frames being constituted by a first frame member of generally U-shaped cross section, which is rigidly connected to the underside of the rear floor panel and a second frame member of generally U-shaped cross-section which is rigidly connected to an upper surface of the rear floor panel and arranged inside the luggage compartment, said first and second frame members being connected together at a peripheral lip region of the spaced openings in the rear floor panel.

2. A structure as claimed in claim 1, wherein said first and second frame members for each of the longitudinal frames are connected together by means of a generally elongated reinforcement member.

3. A structure as claimed in claim 1, wherein a front corner portion of the rear floor panel which is situated where the rear floor panel is stepped down is partially formed with an upheaved portion protruding into the rear luggage compartment.

4. A structure as claimed in claim 3, wherein one end of the first frame member adjacent the second frame member and one end of the second frame member adjacent the first frame member are rigidly connected to the stepped-down area of the rear floor panel and the upheaved portion, respectively.

* * * * *